United States Patent [19]

Katsanevas

[11] 4,170,069

[45] Oct. 9, 1979

[54] WHEEL LUG NUT TOOL

[76] Inventor: Michael Katsanevas, 1060 Fallbrook Way, Sandy, Utah 84070

[21] Appl. No.: 881,275

[22] Filed: Feb. 27, 1978

[51] Int. Cl.$^2$ ............................................. G01B 3/48
[52] U.S. Cl. .............................. 33/199 R; 33/178 B; 85/42
[58] Field of Search ............ 33/147 M, 178 B, 199 R, 33/199 B; 85/42

[56] References Cited

U.S. PATENT DOCUMENTS

| 1,294,004 | 2/1919 | Weaver | 33/199 R |
|---|---|---|---|
| 1,903,121 | 3/1933 | Lussier | 85/42 |
| 2,425,935 | 8/1947 | Hayman | 85/42 |
| 3,209,463 | 10/1965 | Schorr | 33/178 B |
| 3,218,724 | 11/1965 | Schaumberger | 33/199 R |
| 3,406,461 | 10/1968 | Gunderson | 33/199 R |

FOREIGN PATENT DOCUMENTS 870523  6/1961  United Kingdom ................. 33/199 R

OTHER PUBLICATIONS

"Stewart Screw and Bolt Locator", Stewart Manufacturing Co., 1-1947, two pages.

Primary Examiner—Richard R. Stearns
Attorney, Agent, or Firm—J. Winslow Young; H. Ross Workman; Rick D. Nydegger

[57] ABSTRACT

A wheel lug nut tool apparatus and method, the tool including a plurality of wheel lug studs and/or lug sockets mounted to a base. An indicia is affixed adjacent each stud and/or lug socket to indicate the size and thread characteristics of the same. The base is fabricated so as to be easily hand held and may be configurated with a geometric design to provide a convenient handle and hanging device for the tool. The geometric design also provides a pleasing aesthetic appearance to complement an advertising logo or the like affixed to the tool. The tool retains the lug studs and/or lug sockets in a readily-accessible and identifiable configuration to enable the user to more easily determine the unknown size and thread characteristics of a lug nut and/or lug bolt. Advantageously, each lug stud and/or lug socket may be configurated to be replaceable relative to the base by having a standardized basal portion which matingly engages and is secured to a corresponding aperture in the base.

4 Claims, 5 Drawing Figures

WHEEL LUG NUT TOOL

BACKGROUND

1. Field of the Invention

This invention relates to wheel lug nut tools and, more particularly, to a wheel lug nut tool which provides a plurality of wheel lug studs and/or lug sockets in a readily accessible configuration to accommodate determination of the dimensions and thread configuration of lug nut or lug bolt, respectively.

2. The Prior Art

A wheel for an automotive vehicle includes an annular rim portion upon which a peneumatic tire is mounted. The center portion of the wheel is configurated as a generally flat, annular flange oriented parallel to the plan of the wheel. This flange is referred to in the trade as the pad and includes a plurality of apertures disposed in a circle about the center of the pad. These apertures serve as lug bolt and/or lug stud-receiving apertures for mounting the wheel to the hub portion of the automotive vehicle.

The hub portion of the automotive vehicle includes a plurality of male threaded lug studs or lug bolt-receiving, female threaded sockets therein arranged in a circle about the center of the hub. The lug studs extend perpendicularly from the plane of rotation of the hub whereas the lug bolt-receiving threaded sockets are apertures that receive lug bolts perpendicularly to the plane of rotation of the hub.

The automotive industry produces a wide variety of automotive vehicles each year and is responsible for a considerable wholesale and retail trade in goods and services related to providing wheels for the automotive vehicles produced. Currently there are more than a dozen thread types and sizes for the various lug stud/lug nut and lug bolt combinations since each automotive vehicle manufacturer uses its own predetermined combinations for the various types and models of automotive vehicles it produces each year. Although the lug stud/lug nut and lug bolt combinations used by each manufacturer may remain fairly standard for each model year, changes are made continually with regard to these combinations.

Accordingly, sales and service organizations in the wholesale and retail trade related to automotive wheels are required to maintain fairly large inventories of lug studs, lug nuts, and lug bolts in order to meet the anticipated customer demand for replacement items. Historically, neither lug nuts, lug bolts nor lug studs carry a designation as to the type, size or thread size of the item. Furthermore, it would be impossible to imprint a designation for all the various automotive vehicles upon which particular wheel fastener devices would be usable. Accordingly, it becomes very difficult to match a particular lug nut or lug bolt from a loose assortment of lug nuts or lug bolts with its corrensponding lug stud or threaded hub socket, respectively.

Additionally, lug nuts or lug bolts frequently become lost, particularly by carelessness or accident during wheel replacement by persons generally inexperienced with this type of activity. Accordingly, replacement of a missing lug nut or lug bolt results in the possibility for mismatching of threaded fasteners with a resultant damaged thread. A damaged thread resulting from mismatching is an inherently dangerous condition since a damaged threat will not hold a wheel securely to the hub. This is particularly crucial in the absence of any reliable guide as to the particular lug nut and/or lug bolt combination required for a particular automotive vehicle.

It would, therefore, be an advancement in the art to provide a wheel lug nut tool whereby the more common lug studs and lug sockets are mounted on a common base so as to be readily accessible. It would also be an advancement in the art to provide a lug nut tool combination with an associated indicia to enable the prompt and accurate matching of a lug nut with a known lug stud. It would also be an advancement in the art to provide a lug nut tool whereby the various lug studs in the tool may be readily replaced when worn, damaged or outdated. Such an invention is disclosed and claimed herein.

BRIEF SUMMARY AND OBJECTS OF THE INVENTION

The present invention relates to a wheel lug nut tool apparatus and method whereby a plurality of lug studs and/or lug sockets are mounted to a base so as to be readily accessible in a hand-held, geometric configuration. Indicia adjacent each lug stud or socket indicates the size and thread characteristics of the particular lug stud and/or lug socket. Each lug stud and lug socket is configurated as a threaded element which is representative of at least one lug stud or lug socket size and thread configuration. Each lug stud and/or lug socket may be configurated with a standardized basal element so as to be releasably mountable to a standardized base along with a removable indicia thereby accommodating replacement when broken, worn or outdated.

It is, therefore, a primary object of this invention to provide improvements in wheel lug nut tools.

Another object of this invention is to provide an easily hand-held wheel lug nut tool.

Another object of this invention is to provide a wheel lug nut tool whereby the lug studs and lug sockets in the tool may be readily replaceable.

Another object of this invention is to provide improvements in the method of ascertaining the size and thread characteristics of a lug nut and/or lug bolt.

Another object of this invention is to provide a wheel lug nut tool wherein a plurality of wheel lug studs and lug sockets are mounted in an ornamental holder.

Another object of this invention is to provide a wheel lug nut tool wherein an indicia is affixed to the tool adjacent each lug stud and lug socket, each indicia setting forth at least the size and thread characteristics of the adjacent lug stud and lug socket.

These and other objects and features of the present invention will become more fully apparent from the following description and appended claims taken in conjunction with the accompanying drawing.

DETAILED DESCRIPTION OF THE PREFERRED EMBODIMENTS

Figure 1:
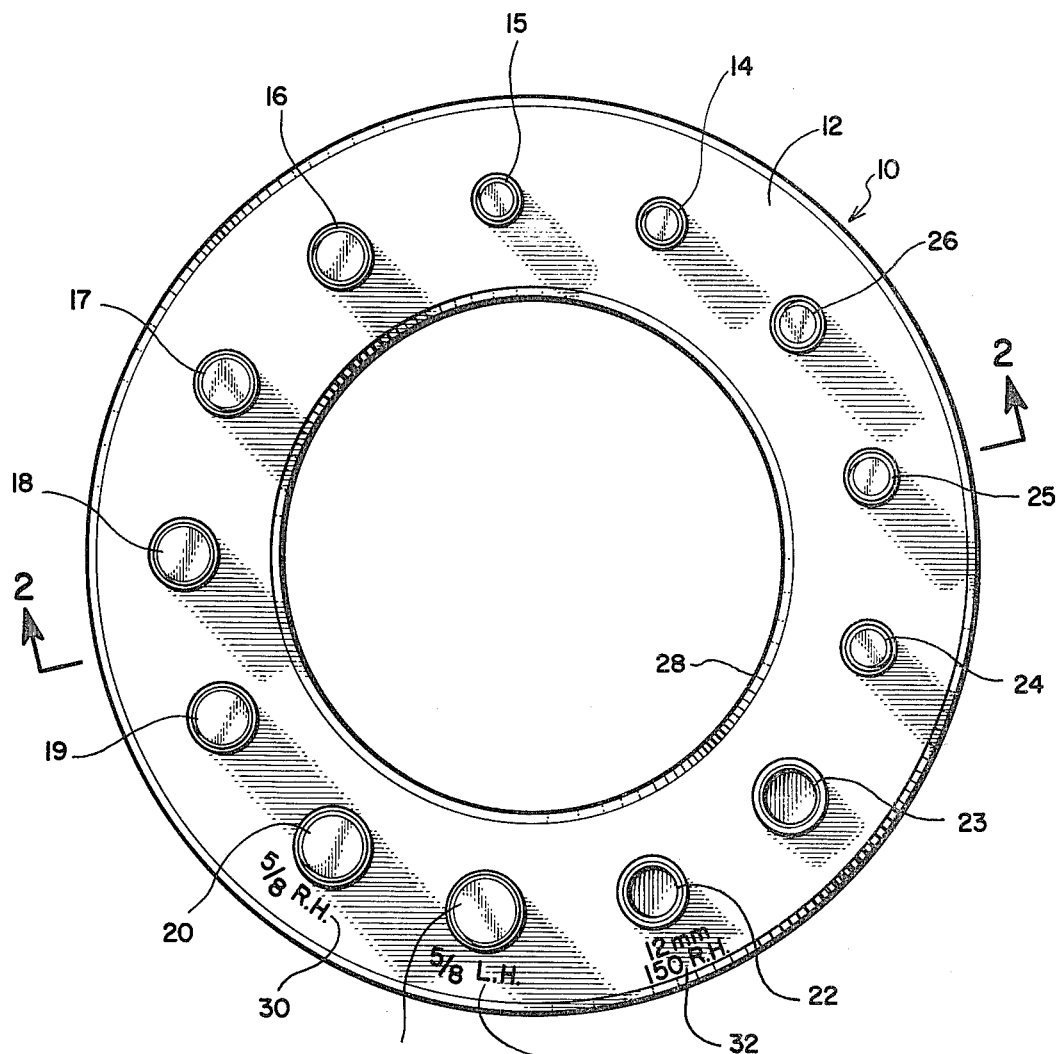
FIG. 1 is a plan view of one presently preferred embodiment of the wheel lug nut tool of this invention.

The invention is best understood by reference to the drawing wherein like parts are designated with like numerals throughout.

Figure 2:
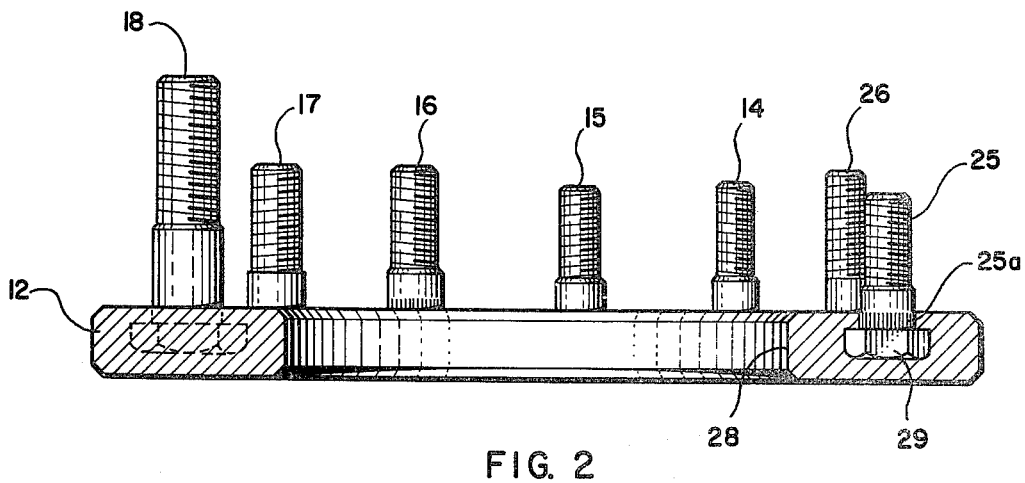
FIG. 2 is a cross section taken along lines 2—2 of FIG. 1.

Referring now more particularly to FIGS. 1 and 2, a first preferred embodiment of the wheel lug nut tool of this invention is shown generally at 10 and includes a base 12 having a plurality of lug studs and lug sockets 14–26 mounted thereon. Base 12 is configured as a ring with a circular cutout 28 in the center thereof. The ring configuration of this first preferred embodiment, wheel lug nut tool 10, renders wheel lug nut tool 10 readily hand held for ease of handling and comparison with a particular lug nut (not shown) when determining whether it fits any of the lug studs 14–26.

It should be particularly pointed out that lug studs 22 and 23 are actually configured as female-threaded sockets corresponding in thread dimension to conventional threaded socket apertures in those automotive vehicles incorporating a threaded socket aperture in the hub for receipt of a threaded lug bolt (not shown). In this latter instance, a female-threaded socket having a predetermined size and thread dimension is affixed to the base 12 and serves as a socket or guide for a particular lug bolt (not shown) to determine the size and thread characteristics of the same.

Base 12 also includes a plurality of indicia 30–32 adjacent lug studs 20–22, respectively. Each of indicia 30–32 is coordinated with the adjacent lug stud to indicate the size of the adjacent lug stud and its thread characteristics. For example, indicia 30 is set forth as being ⅝ R.H. which is a commonly known designation in the trade for a ⅝ inch lug stud having a right hand thread. Additionally, each indicia could also indicate, if desired, a suitable code designation (not shown) representative of the various automotive vehicles upon which the lug stud is usually found. Only three indicia (indicia 30–32) are shown herein, it being clearly understood that indicia are affixed to base 12 adjacent each of lug studs 14–26. Importantly, base 12 holds each of lug studs 14–26 in a fixed configuration in proximity to the adjacent indicia thereby readily overcoming the historical problem of misplacement, loss and mismatching between lug studs and lug nuts.

Referring now more particularly to FIG. 2, base 12 is shown in cross section to more clearly illustrate one possible technique for securing the various lug studs and, more particularly, lug stud 25 thereto. Lug stud 25 is configured as a conventional, commercially available lug stud and includes a head 29 at the end opposite the threaded portion of lug stud 25. Conventionally, the basal periphery of lug stud 25 adjacent bolt head 29 has a plurality of axially oriented ridges 25a formed as minor protrusions thereon to accommodate a secure engagement between lug stud 25 and the aperture in the corresponding hub (not shown). In particular, lug stud 25 is configured to be placed in a press fit relationship in the aperture (not shown). However, in this presently preferred embodiment of the invention, head 29 is embedded in base 12 by suitably casting the material of base 12 about the head 29. Similar features are also found on each of the lug studs 14–26.

Figure 3:
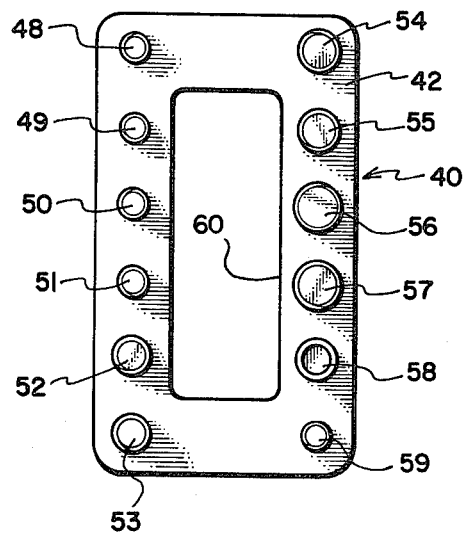
FIG. 3 is a plan view of a second preferred geometric configuration of the wheel lug nut tool of this invention.

Referring now more particularly to FIG. 3, a second preferred embodiment of the wheel lug nut tool is shown generally at 40 and includes a base 42 having a plurality of lug studs 48–59 mounted thereto. It should be noted that lug stud 58 is actually configured as a female-threaded socket for receipt of a male-threaded lug bolt (not shown). Base 42 is configured as an elongated, rectangular body having a rectangular slot 60 formed therein. The configuration of base 42 renders the wheel lug nut tool 40 easily hand held while slot 60 accommodates wheel lug nut tool 40 being suspended from a hook, nail or the like (not shown). Additionally the open area represented by slot 60 may be used to frame advertising material, support an ash tray or other similar uses well known in the promotion, sale, and advertising of goods and services.

Although not shown, each of lug studs 48–59 include a plurality of indicia on base 42 adjacent the respective lug stud. Accordingly, lug nut tool 40 is substantially identical to lug nut tool 10 (FIG. 1) except for the geometric configuration of each.

Figure 4:
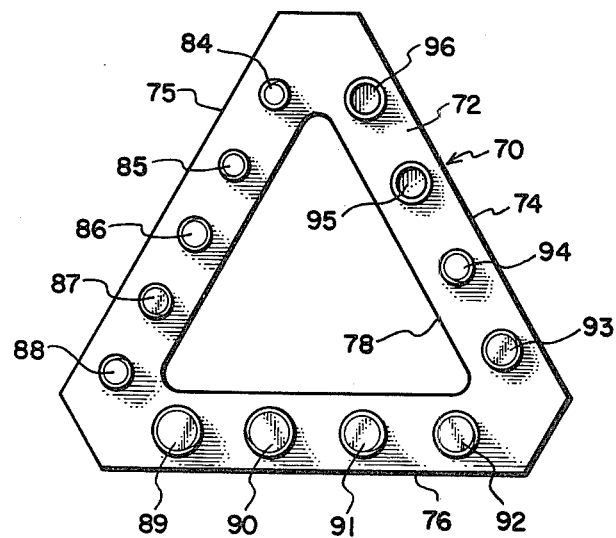
FIG. 4 is a plan view of a third preferred geometric configuration of the wheel lug nut tool of this invention.

With particular reference to FIG. 4, a third preferred embodiment for the wheel lug nut tool of this invention is shown generally at 70. Wheel lug nut tool 70 is configured with a triangular basal portion, base 72 having sides 74–76 and an open, triangular center 78. A plurality of lug studs 84–96 are mounted to base 72. In particular, studs 84–88 are mounted on a side 75 while lug studs 89–92 are mounted on a side 76 and lug studs 93–96 are mounted to a side 74, respectively. It is currently believed that the triangular configurations for base 72 would be readily adaptable, for example, for the three major automobile manufacturers in the United States wherein lug studs for the various automotive vehicles of each automotive vehicle manufacturer would be mounted on a respective side. With the exception of the differences in geometric shape, which lug nut tool 70 is substantially identical in fabrication and function to wheel lug nut tool 40 (FIG. 3) and wheel lug nut tool 10 (FIGS. 1 and 2).

Figure 5:
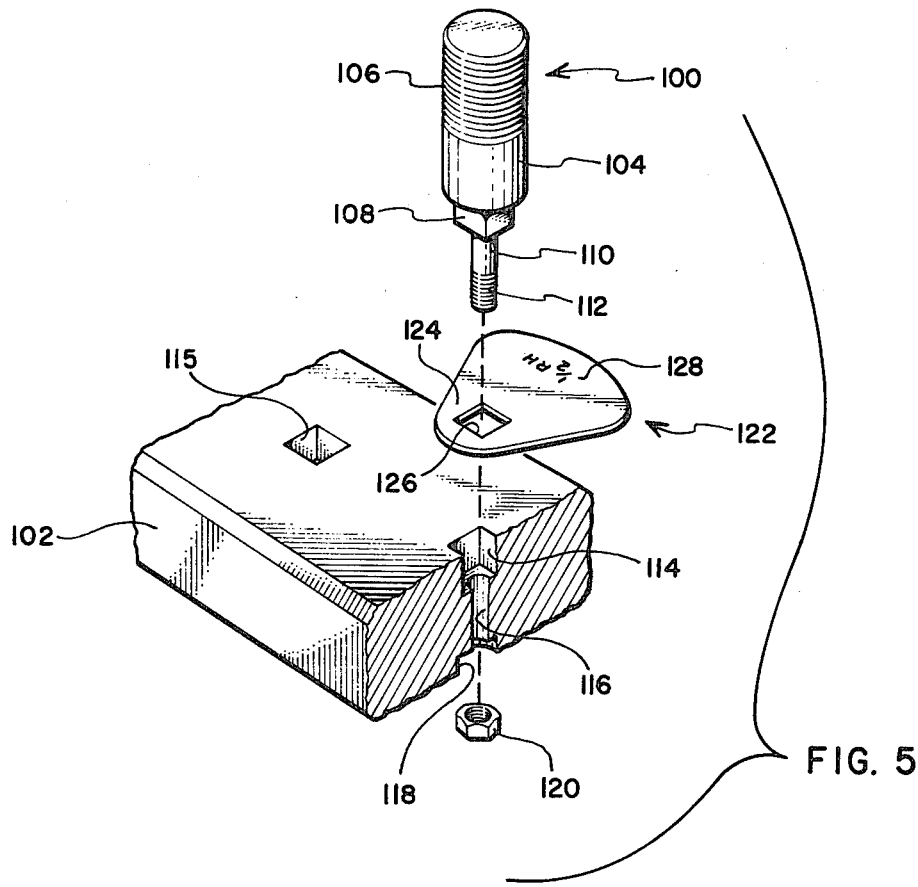
FIG. 5 is an exploded, partial perspective view of a modification of the wheel lug nut tool of this invention with portions shown in cross section and broken away for ease of illustration.

With particular reference to FIG. 5, a partial, exploded, perspective view of a fourth preferred embodiment of the wheel lug nut tool is shown herein generally at 100 and includes a base 102 with a lug stud 104 adapted to be releasably mounted thereto. Base 102 is configured as a solid body which could have any suitable geometric configuration such as shown in FIGS. 1–4 and has a plurality of boss-receiving apertures 114 and 115 therein. In the illustrated embodiment, boss-receiving apertures 114 and 115 are configured as blind recesses having a square cross section. The square cross section serves as a means for inhibiting rotation of the respective lug stud 104 engaged therein. At the bottom of boss-receiving aperture 114 a coaxial throughbore 116 extends through base 102 into a circular recess 118. Circular recess 118 serves as a nut-receiving recess for a nut 120.

Lug stud 104 is configured with a predetermined dimension and with a predetermined thread configuration shown herein as threads 106. The basal portion of lug stud 104 is configured as a square boss 108 having a coaxial stud 110 extending therefrom. Boss 108 is dimensionally configured to be received in any one of the square boss-receiving apertures 114 and 115. Correspondingly, anchor stud 110 is configured to pass through throughbore 116 and has threads 112 on the basal portion thereof for engagement with the threads of a conventional nut 120.

A tag 122 is adapted to be secured to base 102 upon engagement of lug stud 104 thereto. In particular, tag 122 has a tab portion 124 and a square aperture 126 therethrough. Square aperture 126 is dimensionally configured to receive boss 108 therethrough and thereby be clamped to base 102 between lug stud 104 and base 102. Tag 122 includes indicia 128 to indicate the size and thread dimensions of threads 106.

The configuration of wheel lug nut tool 100 readily adapts itself for convenient replacement of lug stud 104 when lug stud 104 is damaged, worn, outdated or otherwise requires replacement. Additionally, lug stud 104 can be readily fabricated from plastic or other suitable material so as to accommodate being inexpensively manufactured. Importantly, each lug stud, regardless of the size and thread configuration, is adapted to have a common securement means, boss 108 and anchor stud 110. Additionally, removal of lug stud 104 from base 102 permits the removal and, where desired, replacement of tag 122 with a suitably corresponding indicia for the replacement lug stud (not shown). Importantly, the features of heel lug nut tool 100 shown in FIG. 5 may be readily adapted to each of the configurations for the wheel lug nut tool shown in FIGS. 1-4.

Advantageously, base 102 as well as base 72 (FIG. 4), base 42 (FIG. 3), and base 12 (FIGS. 1 and 2) may be fabricated from any suitable material such as plastic, aluminum, or the like. In each configuration the respective base can be injection molded or machined to produce the desired configuration. Regardless of the manufacturing technique employed, it is important that each base configuration firmly support the respective lug stud against rotation and loss as well as maintaining the appropriate indicia in close proximity to each lug stud. As such, the wheel lug nut tool of this invention solves a particularly vexatious problem of lost, misplaced, mislabelled lug studs and thereby represents a valuable contribution to the trade.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes that come within the meaning and range of equivalency of the claims are to be embraced within their scope.

What is claimed and desired to be secured by a United States Letters Patent is:

1. A wheel lug nut tool for threaded fasteners comprising:
   a base fabricated as a geometric shape and configurated as a receiver for releasably securing a plurality of lug studs to the base and including a plurality of uniform, geometric recesses with a coaxial throughbore of smaller diameter extending through the base;
   a plurality of threaded lug studs adapted to be releasably mounted to the base, the lug studs representing different types of lug studs, the lug studs each configurated with a geometric boss at one end thereof, the geometric boss having a smaller cross section than the lug stud and dimensionally corresponding to the geometric recess to thereby accommodate being received therein in a nonrotatable engagement, the geometric boss having a threaded bolt extending coaxially therefrom to pass through the coaxial throughbore in the base to accommodate receipt of a nut to thereby releasably secure the lug stud to the base; and
   indicia associated with each of the lug studs to indicate the size and thread type of each of said lug studs, said indicia being configurated as a tab which accommodates being releasably secured to the base upon securement of the lug stud to the base.

2. A wheel lug nut tool for threaded fasteners comprising:
   a base configurated as a geometric shape having a relatively thin profile and a plurality of uniform, noncircular recesses formed in the base, each recess having a reduced diameter, coaxial throughbore extending through the base;
   a plurality of threaded receivers for the threaded fasteners, each threaded receiver being releasably mountable to the base and having a threaded portion at a first end, the threaded portion having a predetermined thread dimension, each threaded receiver having a basal portion at a second end comprising a coaxial, noncircular boss of reduced diameter and a threaded anchor stud extending coaxially from the boss, the boss dimensionally corresponding to the recesses, the threaded anchor stud passing through the throughbore and accommodating receipt of a nut for releasably securing the threaded receiver to the base; and
   indicia associated with each threaded receiver to provide an indication of the predetermined thread dimension of the threaded receiver, each indicia being releasably mountable to the base and fabricated as a tab having a noncircular aperture therethrough for receipt of the noncircular boss to accommodate being clamped to the base between the threaded receiver and the base.

3. The tool defined in claim 2 wherein the base further comprises a coaxial indentation surrounding each throughbore to receive therein in recessed relationship each of the nuts placed on each of the threaded anchor studs.

4. A method for ascertaining the thread dimensions of a threaded fastener comprising:
   fabricating a base as a predetermined geometric configuration;
   forming a plurality of apertures through the base, each aperture having identical dimensions and including a noncircular recess in a first face of the base and a reduced diameter bore extending coaxially from the bottom of the noncircular recess through the base to the opposite face of the base;
   creating a plurality of threaded receivers, each of the threaded receivers having a threaded portion on a first end, said threaded portion having a predetermined but different thread dimension from the other threaded receivers, each of the threaded receivers further having a noncircular boss extending coaxially from a second end of said threaded receiver, said noncircular boss dimensionally corresponding to said noncircular recess in said base for holding said threaded receiver nonrotatably to said base to inhibit rotation of the threaded receiver relative to the base, each of the threaded receivers further having a dimensionally identical, coaxial anchor stud extending from the noncircular boss and adapted to pass through said reduced diameter bore in said base for anchoring the threaded receiver to the base;
   releasably securing the plurality of threaded receivers to said base, by inserting said anchor stud through said noncircular recess and into said reduced diameter bore while mating said noncircular boss of the threaded receiver with said noncircular recess in the base;

placing an indicia in relation to each threaded receiver, each indicia providing identification of the predetermined thread dimension of each respective threaded receiver by releasably securing each indicia to said base by fashioning each indicia as a tab having an opening therein, the opening being adapted to receive the noncircular boss and securing the tab to the base by clamping the tab between the base and the second end of the threaded receiver; and ascertaining the thread dimension of a threaded fastener by matching the threaded fastener with the threads of a correspondingly dimensioned threaded receiver and observing the indicia of said threaded receiver.

* * * * *